(12) United States Patent
David et al.

(10) Patent No.: US 7,466,846 B2
(45) Date of Patent: Dec. 16, 2008

(54) METHOD FOR ANALYZING A PALM PRINT FOR THE IDENTIFICATION OF AN INDIVIDUAL USING GABOR ANALYSIS

(75) Inventors: Zhang Dapeng David, Kowloon (HK); Kong Wai-kin Adams, Kowloon (HK)

(73) Assignee: The Hong Kong Polytechnic University, Kowloon (HK)

( * ) Notice: Subject to any disclaimer, the term of this patent is extended or adjusted under 35 U.S.C. 154(b) by 549 days.

(21) Appl. No.: 10/253,914

(22) Filed: Sep. 25, 2002

(65) Prior Publication Data

US 2004/0057604 A1   Mar. 25, 2004

(51) Int. Cl.
  *G06K 9/00* (2006.01)
(52) U.S. Cl. .................. 382/115; 340/5.53; 340/5.83
(58) Field of Classification Search ............... 382/115; 340/5.53, 5.83
  See application file for complete search history.

(56) References Cited

U.S. PATENT DOCUMENTS

| | | | |
|---|---|---|---|
| 4,032,889 A | | 6/1977 | Nassimbene |
| 4,206,441 A | | 6/1980 | Kondo |
| 4,357,597 A | | 11/1982 | Butler |
| 4,720,869 A | | 1/1988 | Wadia |
| 4,805,223 A | | 2/1989 | Denyer |
| 5,528,355 A | * | 6/1996 | Maase et al. ............ 356/71 |
| 5,717,786 A | | 2/1998 | Kamei |
| 5,719,950 A | | 2/1998 | Osten et al. |
| 5,926,555 A | * | 7/1999 | Ort et al. ............ 382/124 |
| 5,937,082 A | | 8/1999 | Funada |
| 6,018,586 A | | 1/2000 | Kamei |
| 6,038,332 A | | 3/2000 | Fishbine et al. |
| 6,118,891 A | | 9/2000 | Funada |
| 6,175,407 B1 | | 1/2001 | Sartor |
| 6,370,263 B1 | | 4/2002 | Hiratsuka et al. |
| 6,424,727 B1 | * | 7/2002 | Musgrave et al. ........... 382/117 |
| 6,539,101 B1 | | 3/2003 | Black |
| 6,628,810 B1 | * | 9/2003 | Harkin .................. 382/116 |
| 6,819,782 B1 | * | 11/2004 | Imagawa et al. ............ 382/115 |
| 2002/0028009 A1 | * | 3/2002 | Pomata et al. .............. 382/131 |
| 2004/0264742 A1 | * | 12/2004 | Zhang et al. ................ 382/115 |

FOREIGN PATENT DOCUMENTS

CA   2379452   9/2002

(Continued)

OTHER PUBLICATIONS

Han et al., "Personal authentication using palm-print features", Pattern Recognition Society, 2002.*

(Continued)

*Primary Examiner*—Bhavesh Mehta
*Assistant Examiner*—John B Strege
(74) *Attorney, Agent, or Firm*—Jackson & Walker, LLP (57) ABSTRACT

A method of palmprint identification includes obtaining an image of a portion of an inner surface of a hand of an individual. A sub-image of skin surface within a defined area of the inner surface of the hand of obtained from the image. The sub-image is analyzed to obtain texture data for the skin surface with the defined area. The texture data is compared to reference information in a database.

5 Claims, 9 Drawing Sheets

FOREIGN PATENT DOCUMENTS

| | | |
|---|---|---|
| CN | 1302044 | 7/2001 |
| EP | 0930580 | 7/1999 |
| JP | 9167230 | 6/1997 |
| JP | 200048194 | 2/2000 |
| WO | WO99/12123 | 3/1999 |
| WO | WO 02/103618 A1 | 11/2002 |

OTHER PUBLICATIONS

Zhang, David. Automated Biometrics: Technologies and Systems, 2000, Kluwer Academic Publishers, Chapter 6, p. 111-135.*

Jain et al., "Filterbank-Based Fingerprint Matching", IEEETransactions on Image Processing, vol. 9 No. 5, May 2000.*

Kong and Zhang, "Palmprint Texture Analysis based on low-resolution images for personal authentication", IEEE, 2002.*

See attached list.

W. Shu and D. Zhang, "Automated personal identification by palmprint," *Optical Engineering*, vol. 37, No. 8, pp. 2659-2362, 1998.

D. Zhang and W. Shu, "Two novel characteristics in palmprint verification: datum point invariance and line feature matching," *Pattern Recognition*, vol. 32, No. 4, pp. 691-702, 1999.

J. You, W. Li and D. Zhang, "Hierarchical palmprint identification via multiple feature extraction," *Pattern Recognition*, vol. 35, No. 4, pp. 847-859, 2002.

N. Duta, A.K. Jain, and K.V. Mardia, "Matching of palmprint," *Pattern Recognition Letters*, vol. 23, No. 4, pp. 477-485, 2001.

W. Shu, G. Rong, Z. Bain and D. Zhang, "Automatic palmprint verification," *International Journal of Image and Graphics*, vol. 1, No. 1, pp. 135-152, 2001.

C.C. Han, H.L. Cheng, K.C. Fan and C.L. Lin, "Personal authentication using palmprint features," *Pattern Recognition*, vol. 36, No. 2, pp. 371-381, 2003.

G.M. Lu, D. Zhang and K.Q. Wang, "Palmprint recognition using eignpalms features", To be appeared in *Pattern Recognition Letters*, vol. 24, pp. 1463-1467, 2003.

W. Li, D. Zhang and Z. Xu, "Palmpilot identification by Fourier transform," *International Journal of Pattern Recognition and Artificial Intelligence*, vol. 16, No. 4, pp. 417-432, 2002.

D. Zhang, W.K. Kong, J. You and M. Wong, "On-line palmprint identification," *IEEE Transactions on Pattern Analysis and Machine Intelligence*, vol. 25, No. 9, pp. 1041-1050, 2003.

W. K. Kong and D. Zhang, "Feature-Level Fusion for Effective Palmprint Identification" submitted *International Conference on Biometric Authentication* 2004.

Derwent, Abstract Accession No. 2002-597252/64.

* cited by examiner

METHOD FOR ANALYZING A PALM PRINT FOR THE IDENTIFICATION OF AN INDIVIDUAL USING GABOR ANALYSIS

BACKGROUND TO THE INVENTION

1. Field of the Invention

The invention relates to biometrics identification, and in particular to a method for analyzing a palmprint for the identification of an individual.

2. Background Information

Figure 1:
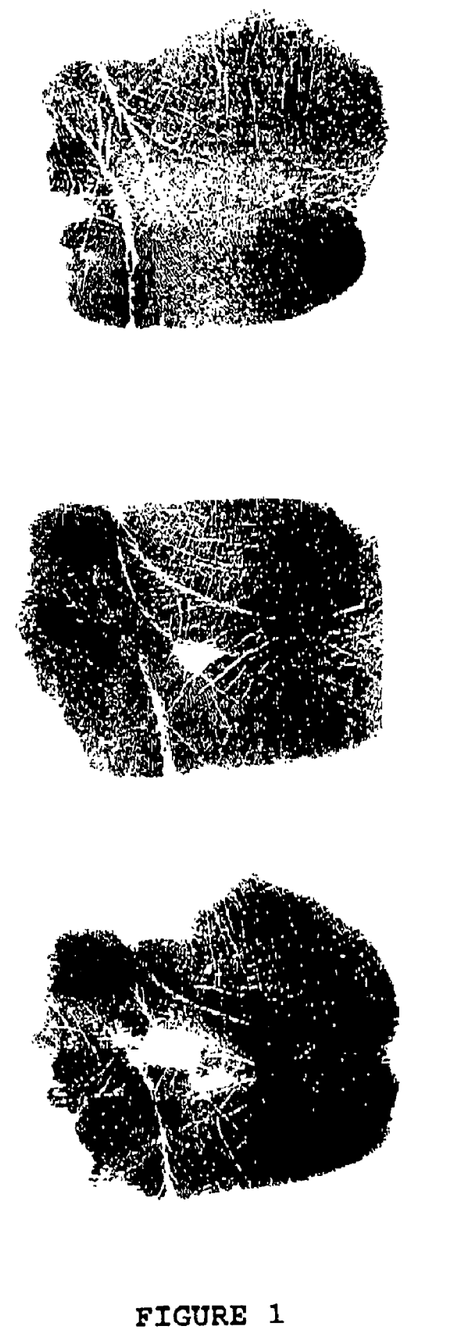
FIG. 1 illustrates typical high-resolution palmprints images.

Using palmprint recognition as a method for personal identification is a new biometrics technology replacing fingerprints. Known methods include analyzing a palmprint to identify singular points, minutiae, and wrinkles in a palmprint image. These known methods require a high-resolution image as illustrated in FIG. 1. This can be obtained by way of inked palmprints. However, these are messy and cannot be obtained passively for real-time identification.

To overcome the problem of inked palmprints some companies have developed high-resolution palmprint scanners and identification systems. However, these devices capturing high-resolution images are costly and rely on high performance computers to fulfil the requirements of real-time identification.

Figure 2:
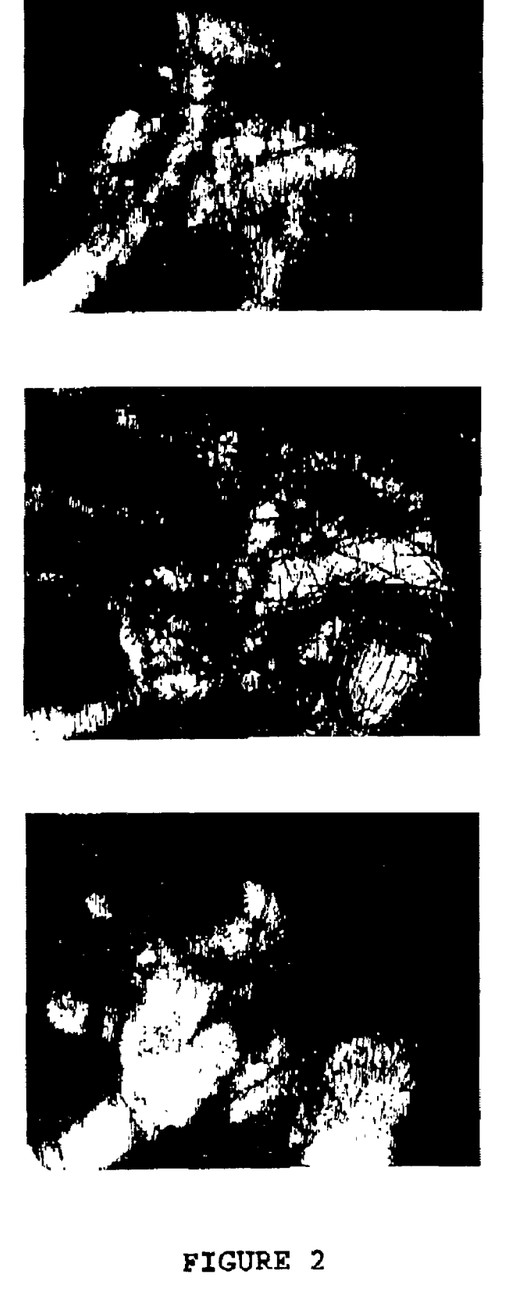
FIG. 2 illustrates typical low-resolution palmprints images.

One solution to the above problems seems to be the use of low-resolution images. FIG. 2 illustrates low-resolution images corresponding to FIG. 1. In low-resolution palmprint images, however, singular points and minutiae cannot be observed easily therefore more easily identifiable wrinkles must play an important role in the identification. It is noted from FIG. 2 however, that only a small proportion of wrinkles are significantly clear, but it is questionable whether they provide sufficient distinctiveness to reliably identify individuals amongst a large population,

SUMMARY OF THE INVENTION

It is an object of the present invention to provide a method of biometrics identification, and in particular a method for analyzing a palmprint for the identification of an individual, which overcomes or ameliorates the above problems.

According to a first aspect of the invention there is provided a method of biometrics identification including:
  obtaining an image of an area of skin surface from an individual,
  analyzing the image to extract texture features on the area of skin surface, and
  comparing the texture features with reference information in a database.

According to a second aspect of the invention there is provided a method of biometrics identification including:
  obtaining an image of a portion of an inner surface of a hand of an individual,
  obtaining a sub-image of skin surface within a defined area of the inner surface of the hand,
  analyzing the sub-image to obtain texture data for the skin surface, and
  comparing the texture data with reference information in a database.

Preferably, the defined area is dependent on one or more characteristics of the hand.

Preferably, the one or more characteristics are the areas between fingers of the hand.

Preferably, the sub-image is obtained by steps including:
  identifying at least two points representing the areas between fingers of the hand,
  determining a coordinate system having a first and a second axis, wherein the two points are located on the first axis and are equidistant from the second axis, and
  determining parameters of the sub-image within the coordinate system using the distance between the two points.

Preferably, the parameters of the sub-image include points in the coordinate system represented by:
  (0.25D, 0.5D), (1.25D, 0.5D), (0.25D, −0.5D) and (1.25D, −0.5D)
where D is the distance between the two points.

Preferably, there is a further step of normalizing the sub-image.

Preferably, analyzing the sub-image includes using a Gabor Filter.

Preferably, analyzing the sub-image includes segmenting layers of the sub-image with low resolution using Gabor analysis.

Preferably, the sub-image is segmented into two parts, a real part and an imaginary part, each part being stored as a vector.

Preferably, comparing the texture data with reference information in the database is based on a hamming distance of the form:

$$D_0 = \frac{\sum_{i=1}^{N}\sum_{j \neq 1}^{N} P_M(i,j) \cap Q_M(i,j)((P_R(i,j) \otimes Q_R(i,j) + P_I(i,j) \otimes Q_I(i,j)))}{2\sum_{i=1}^{N}\sum_{j=1}^{N} P_M(i,j) \cap Q_M(i,j)},$$

where $P_R$ ($Q_R$) and $P_I$ ($Q_I$) are the real part and the imaginary part.

Further aspects of the invention will become apparent from the following description, which is given by way of example only.

BRIEF DESCRIPTION OF THE DRAWINGS

Embodiments of the invention will now be described with reference to the accompanying drawings in which.

DESCRIPTION OF THE PREFERRED EMBODIMENTS

A method of palmprint identification according to the invention comprises three parts: 1) obtaining an image of the palmprint of an individual, 2) analyzing the skin texture data from the image and 3) matching the skin texture data with information stored in a database. These steps are described in more detail below.

1) Obtaining an Image of the Palmprint of an Individual

Figure 3:
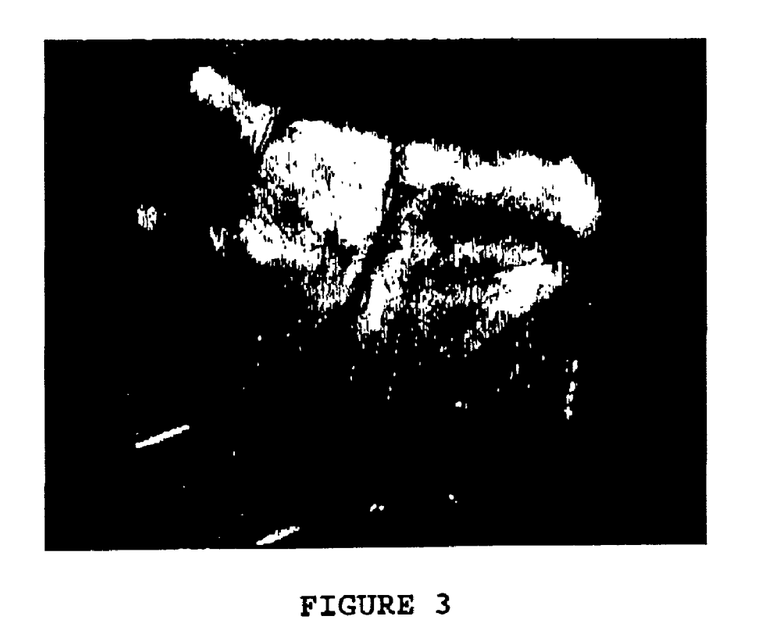
FIGS. 3 to 8 illustrate preprocessing of an image of the inside of a hand.

Referring to FIG. 3, a low-resolution image of a portion the inside surface of a hand is obtained in known manner using a CCD camera. In order to extract identification data from the image a repeatable sub-image of the palm area must be identified using characteristics of the hand. In the preferred embodiment the holes between fingers are identified and used as the parameters to build a coordinate system in which parameters that define the sub-image can be found. The preferred embodiment has six main steps, which are given below.

Figure 4:
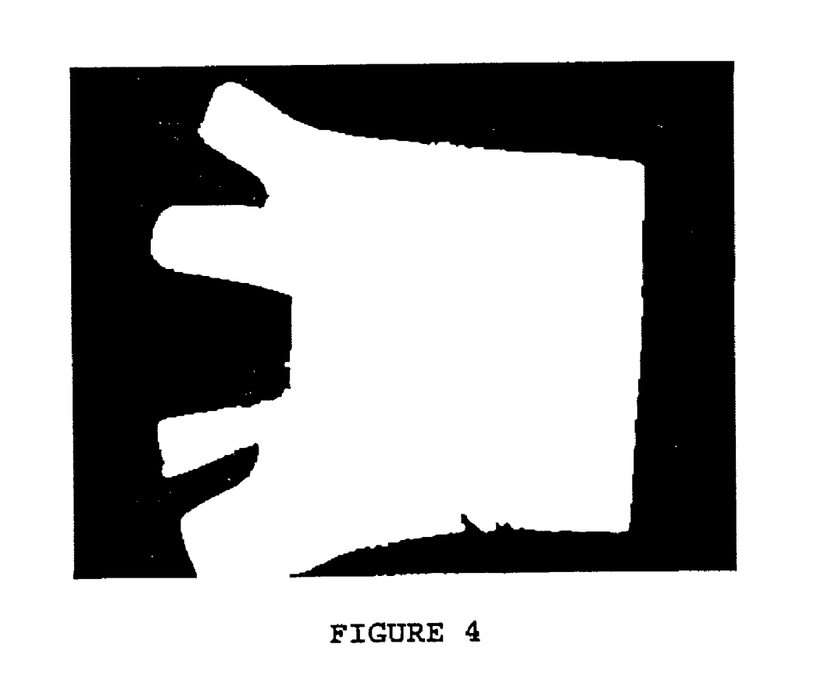

Referring to FIG. 4, the first step is to apply a lowpass filter, L(u,v), such as Gaussian, to the original is image, O(x,y). Then, a threshold, $T_p$, is used to convert the convoluted image to a binary image, B(x,y).

Figure 5:
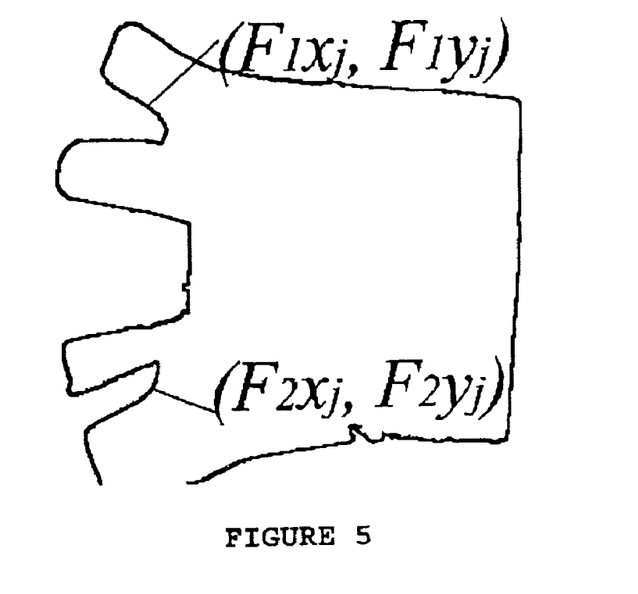

Referring to FIG. 5 the second step is to obtain the boundaries of the holes, $(F_i x_j, F_i y_j)$: where i=1, 2, between the fingers using a boundary tracking algorithm. The boundary of the hole between ring and middle fingers is not extracted since it is not useful for the following processing.

Figure 6:
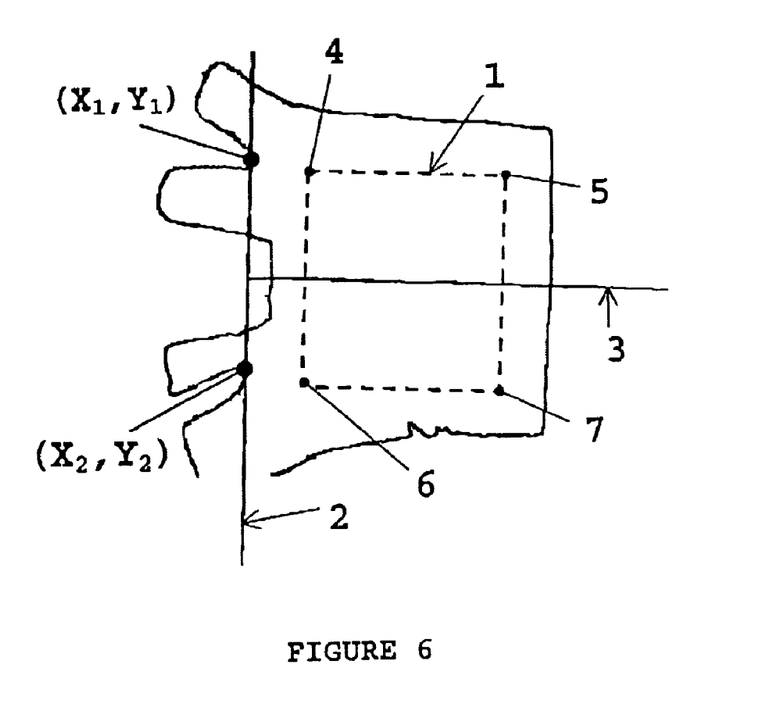

Referring to FIG. 6, the third step is to compute the tangent of the holes $(F_i x_j, F_i y_j)$. If $(x_1, y_1)$ and $(x_2, y_2)$ are two points on $(F_1 x_j, F_1 y_j)$ and $(F_2 x_j, F_2 y_j)$, respectively the line (y=mx+c) passing through these two points satisfies the inequality, $F_1 y_j, m F_1 x_j + C$, for all i and j. The line (y=mx+c) is the tangent of the two holes. This line, represented by numeral 2 in FIG. 6, is the Y-axis of the coordinate system for determining the location of the sub-image 1.

The fourth step is to find a line 3 passing through the midpoint of the two points that is perpendicular to line 2 to determine the X-axis and origin of the coordinate system. The two points lie on the Y-axis, equidistant from the X-axis.

The fifth step is to extract a sub-image 1 with a dynamic size on the basis of the coordinate system. The size and location of the sub-image 1 are based on the Euclidean distance (D) between the two points $(x_1, y_1)$ and $(x_2, y_2)$. The points 4, 5, 6, 7 representing the corners of the sub-image 1 in the coordinate system are (0.25D, 0.5D), (1.25D, 0.5D), (0.25D, −0.5D) and (1.25D, −0.5D) respectively. Thus the sub-image 1 is square with a distance along each side equal to the Euclidean distance and symmetrical about the Y-axis line 3. Because the sub-image is based on feature of the hand (the area between the fingers) it is repeatable for each individual hand.

Figure 7:
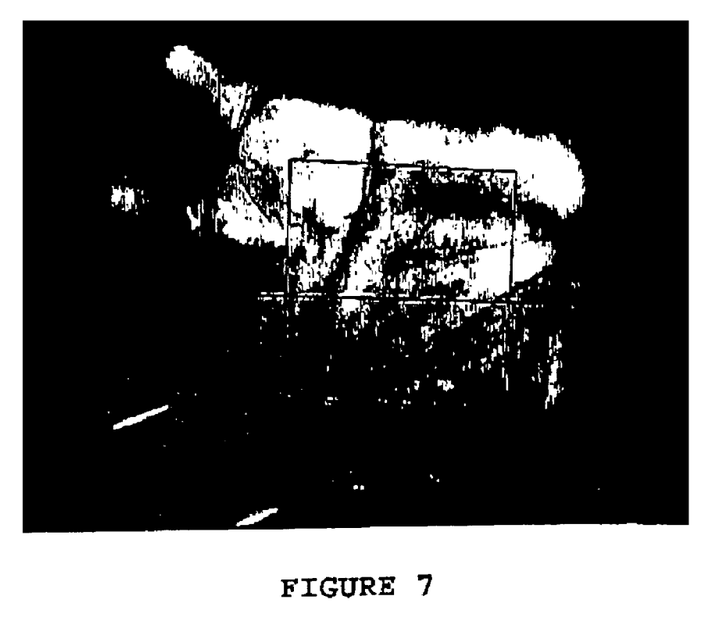

FIG. 7 shows the x and y axes 2, 3 of the coordinate system and the sub-image 1 overlaid on the raw image of FIG. 3.

Figure 8:
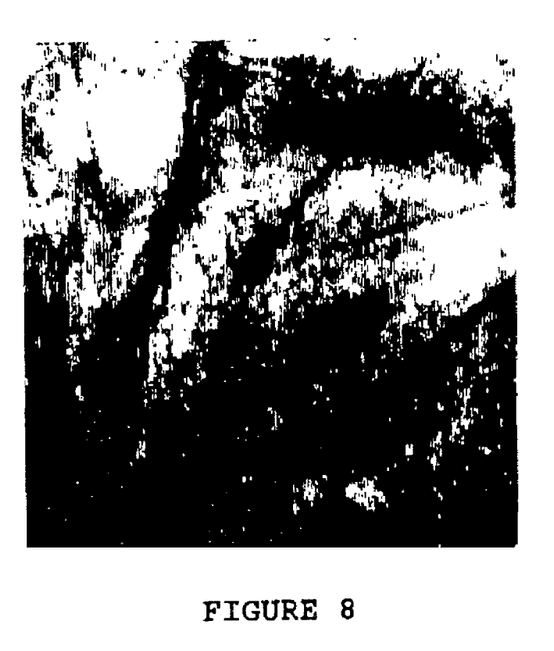

The sixth step is to extract and normalize the sub-image 1 to a standard size using bilinear interpolation for feature extraction. FIG. 8 shows the extracted and normalized sub-image 1.

Once the palm sub-image 1 is obtained the next part of the method is undertaken.

2) Analyzing the Skin Texture of the Image

The circular Gabor filter is an effective tool for texture analysis, and has the following general form, $$G(x, y, \theta, u, \sigma) = \frac{1}{2\pi\sigma^2} \exp\left\{-\frac{x^2 + y^2}{2\sigma^2}\right\} \exp(2\pi i(ux\cos\theta + uy\sin\theta)), \quad (1)$$

where $i=\sqrt{-1}$; u is the frequency of the sinusoidal wave; $\theta$ controls the orientation of the function and $\sigma$ is the standard deviation of the Gaussian envelope. Gabor filters are widely used in texture analysis and thus the skilled addressee will be familiar with their use for such purpose, In order to make the texture analysis more robust to variations in image brightness a discrete Gabor filter $G[x,y,\theta,u,\sigma]$ is turned to zero DC with the application of the following formula:

$$\tilde{G}[x, y, \theta, u, \sigma] = G[x, y, \theta, u, \sigma] - \frac{\sum_{j=-n}^{n}\sum_{j=-n}^{n} G[i, j, \theta, u, \sigma]}{(2n+1)^2}, \quad (2)$$

where $(2n+1)^2$ is the size of the filter. In fact, the imaginary part of the Gabor filter automatically has zero DC because of odd symmetry. The use of the adjusted Gabor filter is to filter the preprocessed images. Then, the phase information is coded by the following inequalities, $$b_r = 1 \text{ if } \text{Re}\left(\sum_{y=-n}^{n}\sum_{x=-n}^{n} \tilde{G}[x, y, \theta, u, \sigma] I(x + x_o, y + y_o)\right) \geq 0, \quad (3)$$

$$b_r = 0 \text{ if } \text{Re}\left(\sum_{y=-n}^{n}\sum_{x=-n}^{n} \tilde{G}[x, y, \theta, u, \sigma] I(x + x_o, y + y_o)\right) < 0, \quad (4)$$

$$b_l = 1 \text{ if } \text{Im}\left(\sum_{y=-n}^{n}\sum_{x=-n}^{n} \tilde{G}[x, y, \theta, u, \sigma] I(x + x_o, y + y_o)\right) \geq 0, \quad (5)$$

$$b_l = 0 \text{ if } \text{Im}\left(\sum_{y=-n}^{n}\sum_{x=-n}^{n} \tilde{G}[x, y, \theta, u, \sigma] I(x + x_o, y + y_o)\right) < 0, \quad (6)$$

where I(x, y) is a preprocessed image and $(x_o, y_o)$ is center of filtering.

Figure 9:
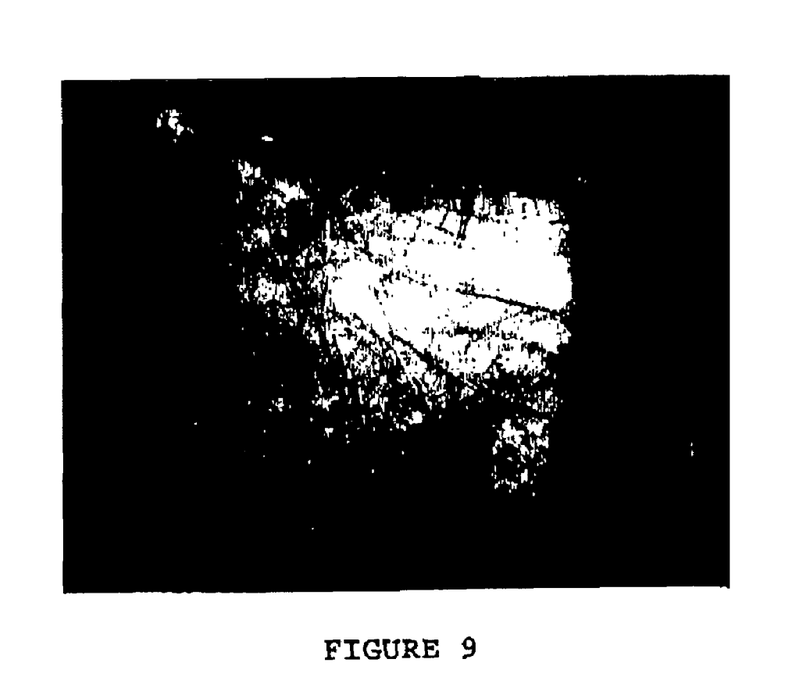
FIGS. 9 and 10 illustrate incorrect placement of a hand on a palm reader and the corresponding preprocessed image.
Figure 10:
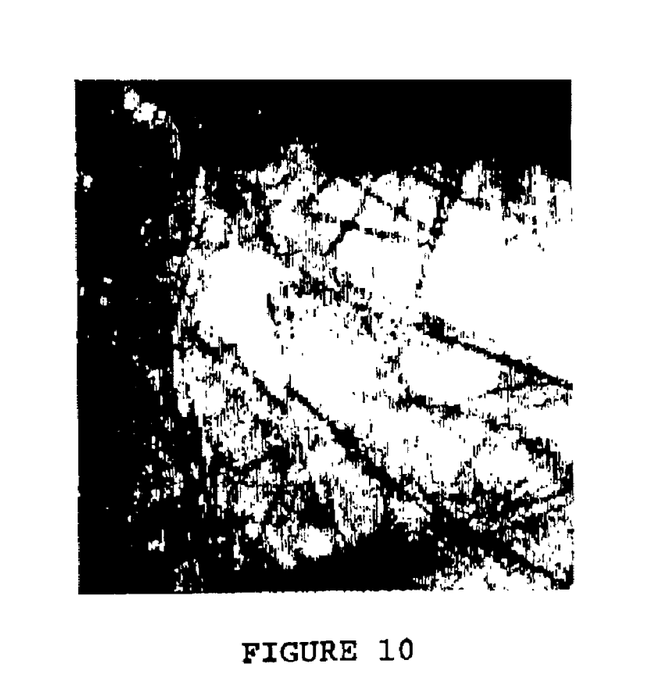

Referring to FIGS. 9 and 10, since it is expected that some users will not place their hand correctly some non-palmprint pixels will be contain in the palm sub-image. A mask is generated to point out the location of the non-palmprint pixels Because the image source can be considered a semi-closed environment, the non-palmprint pixels come from the black boundaries of the image background. Thus a threshold can be used to segment the non-palmprint pixels. Typically, feature size including mask and palmprint features is 384 bytes.

Figure 11:
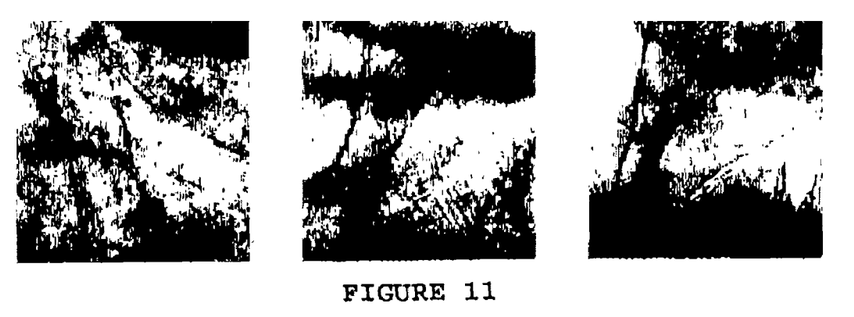
FIGS. 11 to 14 illustrate the preprocessed image, real and imaginary parts and the masks.
Figure 12:
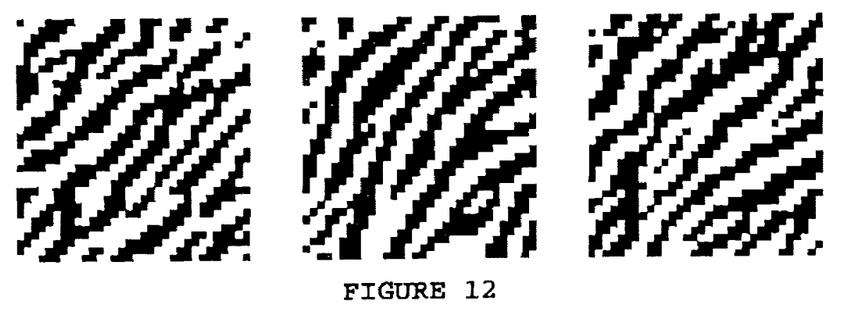
Figure 13:
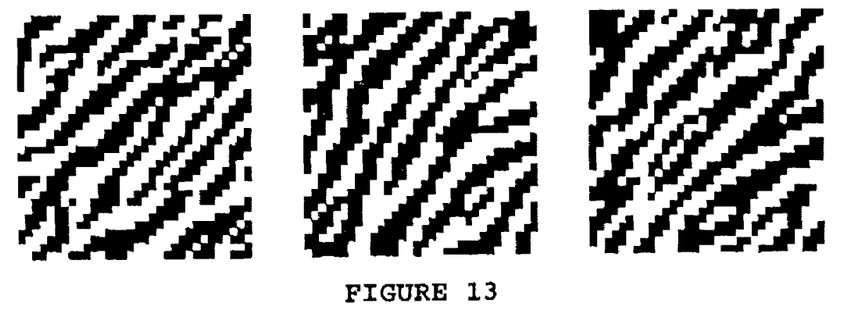
Figure 14:
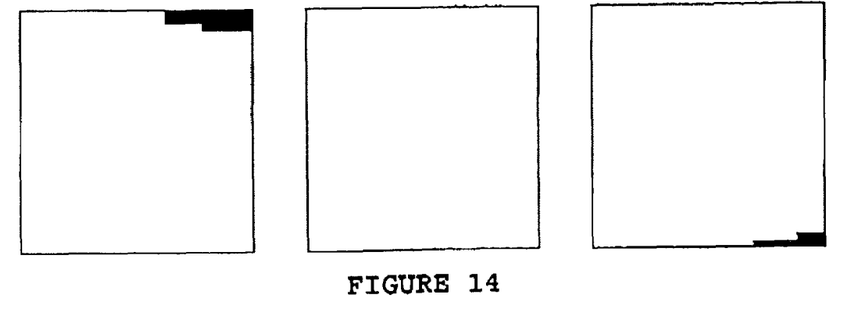

FIG. 11 depict the preprocessed images, 12 depict the real part of the corresponding texture features, 13 depict the imaginary part of the corresponding texture features, and FIG. 14 depicts the corresponding masks.

A useful discussion on the use of Gabor filters for texture analysis can be found in the following two publications.

A. Jain and G. Healey, "A multiscale representation including opponent color features for texture recognition", IEEE Transactions on Image Processing, vol. 7, no. 1, pp. 124-128, 1998.

D. Dunn and W. E. Higgins, "Optimal Gabor filters for texture segmentation," IEEE Transactions on Image Processing, vol. 4, no. 4, pp. 947-964, 1995.

3) Palmprint Matching

The real and imaginary features are represented as vectors, which are compared to vectors of stored palmprint data. Palmprint matching is based on a normalized hamming distance. For example, let P and Q be two palmprint feature matrixes. The normalized hamming distance can be described as, $$D_o = \frac{\sum_{i=1}^{N}\sum_{j=1}^{N} P_M(i,j) \cap Q_M(i,j)((P_R(i,j) \otimes Q_R(i,j) + P_I(i,j) \otimes Q_I(i,j)))}{2\sum_{i=1}^{N}\sum_{j=1}^{N} P_M(i,j) \cap Q_M(i,j)}, \quad (7)$$

where $P_R$ ($Q_R$), $P_I$ ($Q_I$) and $P_M$($Q_M$) are the real part, the imaginary part and mask of P (Q), respectively; the result of Boolean operator, "$\hat{x}$", is equal to zero if and only if the two bits, $P_{R(I)}$ (i,j), equal to $Q_{R(I)}$ (i,j); ∩ represents an AND operator and the size of the feature matrixes is N×N. It is noted that $D_0$ is between 1 and 0. For perfect matching, the matching score is zero. Because of imperfect preprocessing, the features need to be vertically and horizontally translated and then matched again. Then, the range of vertical and horizontal translation is −2 to 2. The minimum of $D_o$'s obtained by translated matching is considered as the final matching score, The following experimental results illustrate the effectiveness of a system according to the invention.

Palmprint images were collected from 154 subjects using a palmprint scanner. Approximately 65% of the subjects were male. The age distribution of the subjects is shown in the following Table 1.

| Ranges of Ages | Percentage |
| --- | --- |
| 10-20 | 2% |
| 21-30 | 80% |
| 31-40 | 12% |
| 41-50 | 3 |
| 51-60 | 2% |
| 61-70 | 1% |

Figure 15:
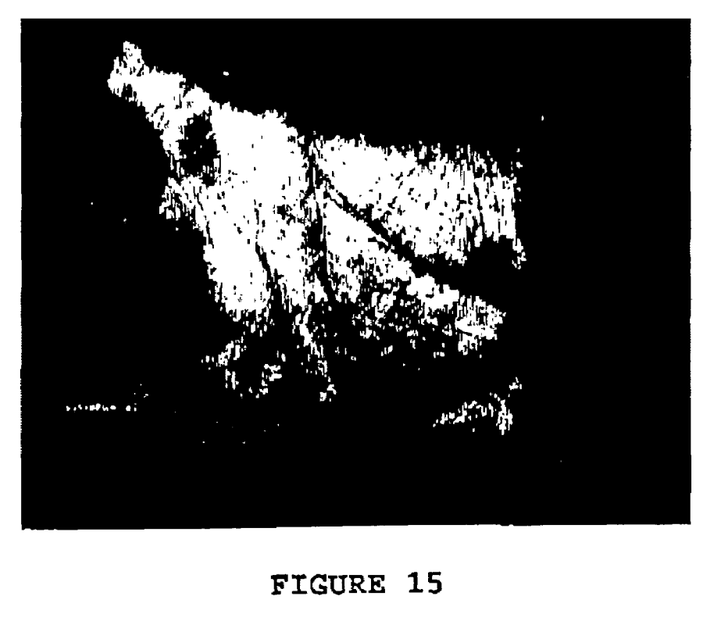
FIGS. 15 and 16 illustrate the difference in image quality between first and second collected images.
Figure 16:
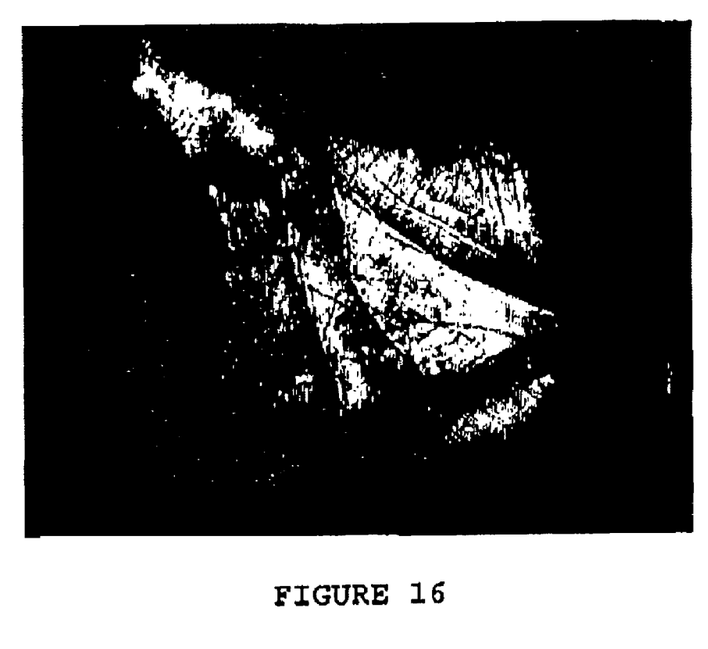

Each subject provided two groups of images. Each group contained 10 images for the left palm and 10 images for the right palm. Totally, each subject provided 40 images to create an image database containing 6191 images from 308 different palms. The average time difference between the collection of the first and second groups of image from each subject was 57 days. The maximum and minimum time differences were 90 and 4 days respectively. After finishing the first collection, the light source was changed and the focus adjusted on the CCD camera so as to simulate image collection by two different palmprint s scanners. FIGS. 15 and 16 show corresponding hand images captured in the first and second groups for one subject. The collected images were in two sizes, 384×284 and 768×568. The larger images were resized to 384×284; consequently, the size of all the test images in the following experiments is 384×284 with 75 dpi resolution.

To obtain the verification accuracy of the palmprint system, each palmprint image was matched with all palmprint images in the database. A matching was noted as is a correct matching of two palmprint images from the same palm of the same subject. The total number of comparisons was 19,161,145. The number of correct matches was 59,176.

Figure 17:
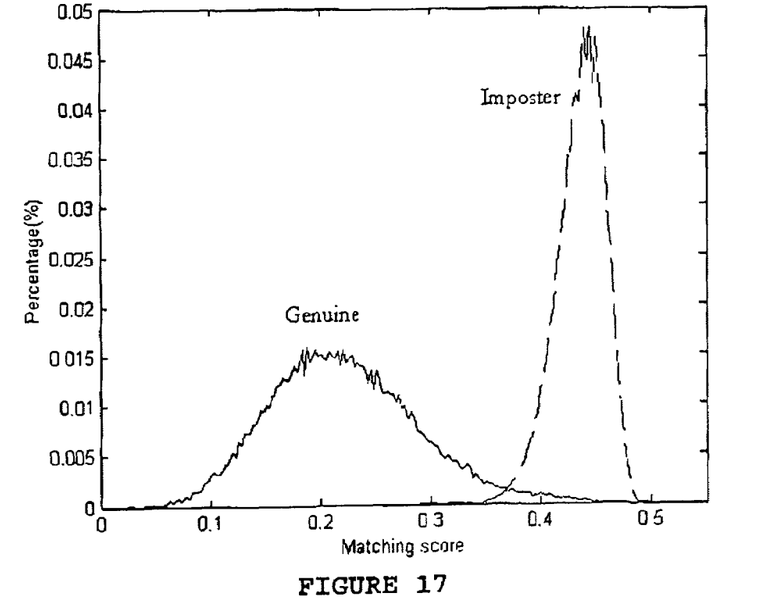
FIGS. 17 and 18 show verification test results for a method according to the invention.
Figure 18:
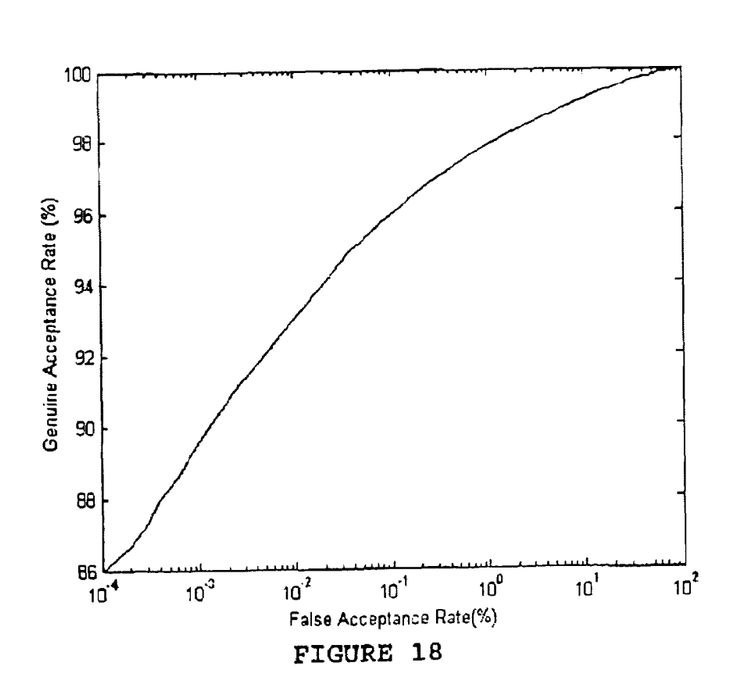

A probability distributions for genuine and imposter estimated by the correct and incorrect matching, respectively, is shown in FIG. 17. FIG. 18 depicts the corresponding Receiver Operating Curve (ROC), being a plot of genuine acceptance rate against false acceptance rate for all possible operating points. From FIG. 18 it is estimated that a method according to the invention can operate at 96% genuine acceptance rate and 0.1% false acceptance rate; the corresponding threshold is 0.35. This result is comparable with prior art palmprint approaches and other hand-based biometrics technologies including hand geometry and fingerprint verification.

A method according to the invention utilizes low-resolution images and has low-computational cost. The verification accuracy is found to be comparable with known high-performance methods using high-resolution images.

The invention can be used for access control, ATM and various security systems.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What is claimed is:

1. A method of biometrics identification including:
   obtaining an image of an area of a portion of an inner surface from an individual,
   identifying at least two points representing the areas between fingers of the hand determining a coordinate system for the image, the coordinate system having a first and a second axis, wherein the two points are located on the first axis and are equidistant from the second axis;
   identifying a sub-image of the image, the sub-image including skin surface within an area defined by points (0.25D, 0.5D), (1.25D, 0.5D), (0.25D, −0.5D) and (1.25D, −0.5D) in the coordinate system, where D is the distance between the two points,
   analyzing the image to extract texture features of the skin surface, and storing the texture data as a vector, wherein analyzing the image includes applying a threshold to the sub-image to identify palm print pixels in the image and analyzing the palm print pixels using a Gabor analysis, and
   comparing the texture features with reference information in a database based on a hamming distance.

2. A method of biometrics identification including:
   obtaining an image of a portion of an inner surface of a hand of an individual,
   obtaining a sub-image of skin surface within a defined area of the inner surface of the hand, wherein the sub-image is obtained by identifying at least two points representing the areas between fingers of the hand, determining a coordinate system having a first and a second axis such that the two points are located on the first axis and are equidistant from the second axis, and identifying sub-image parameters including points in the coordinate system represented by (0.25D, 0.5D), (1.25D, 0.5D), (0.25D, −0.5D) and (1.25D, −0.5D) where D is the distance between the two points,
   analyzing the sub-image to obtain texture data for the skin surface, and
   comparing the texture data with reference information in a database.

3. A method of claim 2 including a further step of normalizing the sub-image.

4. A method of claim 2 wherein the sub-image is segmented into two parts, a real part and an imaginary part, each part being stored as a vector.

5. A method of claim 2 wherein the hamming distance of the form:

$$D_o = \frac{\sum_{i=1}^{N}\sum_{j=1}^{N} P_M(i,j) \cap Q_M(i,j)((P_R(i,j) \otimes Q_R(i,j) + P_I(i,j) \otimes Q_I(i,j)))}{2\sum_{i=1}^{N}\sum_{j=1}^{N} P_M(i,j) \cap Q_M(i,j)},$$

where $P_R$ ($Q_R$) and $P_x$ ($Q_x$) are the real part and the imaginary part, and $P_m$ ($Q_m$) are a mask that is generated to point out the location of pixels that are not part of the inner surface of the hand, wherein P and Q are feature matrices of the inner surface of the hand, and $D_o$ is the hamming distance.

\* \* \* \* \*